(12) United States Patent
Inha et al.

(10) Patent No.: US 9,401,768 B2
(45) Date of Patent: Jul. 26, 2016

(54) NEAR FIELD COMMUNICATION APPARATUS

(75) Inventors: Kai Inha, Järvenpää (FI); Juha Backman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 43 days.

(21) Appl. No.: 14/344,902

(22) PCT Filed: Sep. 16, 2011

(86) PCT No.: PCT/IB2011/054067
§ 371 (c)(1),
(2), (4) Date: Mar. 13, 2014

(87) PCT Pub. No.: WO2013/038235
PCT Pub. Date: Mar. 21, 2013

(65) Prior Publication Data
US 2014/0369170 A1    Dec. 18, 2014

(51) Int. Cl.
| | |
|---|---|
| H04R 1/00 | (2006.01) |
| H04B 11/00 | (2006.01) |
| H04B 5/00 | (2006.01) |
| H04M 1/725 | (2006.01) |
| H04R 1/10 | (2006.01) |
| H04R 25/00 | (2006.01) |
| H04R 11/06 | (2006.01) |
| H04R 5/033 | (2006.01) |
| H04M 1/60 | (2006.01) |

(52) U.S. Cl.
CPC ............. *H04B 11/00* (2013.01); *H04B 5/0006* (2013.01); *H04B 5/0031* (2013.01); *H04B 5/0075* (2013.01); *H04M 1/7253* (2013.01); *H04R 1/1091* (2013.01); *H04R 25/43* (2013.01); *H04M 1/6058* (2013.01); *H04M 2250/64* (2013.01); *H04R 5/033* (2013.01); *H04R 11/06* (2013.01); *H04R 25/554* (2013.01); *H04R 2420/07* (2013.01)

(58) Field of Classification Search
USPC .......................................... 381/331, 406, 400
See application file for complete search history.

(56) References Cited

U.S. PATENT DOCUMENTS

| | | | |
|---|---|---|---|
| 4,711,152 A | 12/1987 | Fortunko | |
| 4,802,228 A * | 1/1989 | Silverstein et al. | ........... 381/320 |
| 5,557,673 A * | 9/1996 | Ginzburg | .............. H04M 1/215 |
| | | | 379/443 |
| 5,812,598 A | 9/1998 | Sharma et al. | |
| 7,149,552 B2 | 12/2006 | Lair | |

(Continued)

FOREIGN PATENT DOCUMENTS

| | | |
|---|---|---|
| CN | 1967940 A | 5/2007 |
| CN | 101232124 A | 7/2008 |

(Continued)

OTHER PUBLICATIONS

"Speaker (coil) . . . Usable As Antenna?", Antenna & propagation engineering Forum, Retrieved on Nov. 25, 2014, Webpage available at : http://www.eng-tips.com/viewthread.cfm?qid=182929.

(Continued)

*Primary Examiner* — Amir Etesam
(74) *Attorney, Agent, or Firm* — Harrington & Smith

(57) ABSTRACT

An apparatus comprising: a transducer suitable for generating an acoustic sound pressure wave being configured to: magnetically couple the apparatus to a further apparatus transducer for transferring data.

18 Claims, 12 Drawing Sheets

(56) References Cited

U.S. PATENT DOCUMENTS

| | | |
|---|---|---|
| 7,254,366 B2 | 8/2007 | Palermo et al. |
| 2003/0162556 A1 | 8/2003 | Libes |
| 2004/0052392 A1* | 3/2004 | Sacha .................... H04R 25/43 381/331 |
| 2007/0032274 A1 | 2/2007 | Lee et al. |
| 2009/0060243 A1 | 3/2009 | Michaelis |
| 2009/0081943 A1 | 3/2009 | Dobyns et al. |
| 2010/0081379 A1 | 4/2010 | Cooper et al. |
| 2011/0031928 A1 | 2/2011 | Soar |
| 2011/0287712 A1* | 11/2011 | Conway et al. .............. 455/41.1 |

FOREIGN PATENT DOCUMENTS

| | | |
|---|---|---|
| GB | 2469345 | 10/2010 |
| TW | 200718152 A | 5/2007 |
| WO | 2004034738 | 4/2004 |
| WO | 2006134428 | 12/2006 |
| WO | 2007/032890 A1 | 3/2007 |
| WO | 2008113053 | 9/2008 |
| WO | 2011031910 | 3/2011 |
| WO | 2011/063033 A2 | 5/2011 |

OTHER PUBLICATIONS

International Search Report received for corresponding Patent Cooperation Treaty Application No. PCT/IB2011/054067, dated Jun. 20, 2012, 5 pages.

Extended European Search Report received for corresponding European Patent Application No. 11872499.6, dated May 19, 2015, 5 pages.

* cited by examiner

Modern flat terminal device speaker mechanical structure is such that it can form a loosely coupled E-core transformer when two of these speakers are brought to face-to-face arrangement according to the invention

NEAR FIELD COMMUNICATION APPARATUS

RELATED APPLICATION

This application was originally filed as PCT Application No. PCT/IB2011/054067 filed Sep. 16, 2011.

FIELD OF THE APPLICATION

The present application relates to a method and apparatus for providing near field communication using speaker elements. In some embodiments the method and apparatus relate to a near field communication using speaker elements for mobile apparatus.

BACKGROUND OF THE APPLICATION

Some portable electronic devices comprise transducers such as loudspeakers and/or earpieces which are required to be small in size. Transducers are important components in electronic devices such as mobile phones for the purposes of playing back music or having a telephone conversation. The quality and loudness of a transducer in an electronic device are important especially if a user listens to sounds generated by an electronic device at a distance from the electronic device.

Furthermore in portable devices, cost is an issue particularly in low to medium product sectors. Often these electronic devices, such as mobile phones are equipped with only the basic communication options such as being able to communicate using a cellular communication transceiver and antenna with a cellular communication system. Equipping such devices with other antenna, such as Bluetooth and wireless local area network (WLAN) optimised antenna is not cost efficient in these device categories.

SUMMARY OF SOME EMBODIMENTS

There is provided according to a first aspect of the application an apparatus comprising: a transducer suitable for generating an acoustic sound pressure wave being configured to: magnetically couple the apparatus to a further apparatus transducer for transferring data.

The transducer may comprise: a transducer coil configured to generate a magnetic field for magnetically coupling the transducer to the further apparatus; and a speaker diaphragm coupled to the transducer coil suitable for generating the acoustic sound pressure wave.

The transducer may comprise: a transducer coil configured to detect a magnetic field for magnetically coupling the transducer to the further apparatus; and a speaker diaphragm coupled to the transducer coil suitable for generating the acoustic sound pressure wave.

The apparatus may further comprise a magnetic field data detector configured to detect data within the magnetic field coupling the apparatus transducer to the further apparatus.

The magnetic field detector may comprise an analogue comparator configured to detect the data within the magnetic field.

The magnetic field detector may comprise: an amplifier coupled to the transducer coil and configured to amplify the transducer coil output; and a demodulator coupled to the amplifier and configured to output the data from the transducer coil output.

The apparatus may further comprise an amplifier configured to be selectively coupled to the transducer.

The amplifier may be configured to drive the transducer coil to magnetically couple the apparatus to a further apparatus transducer for transferring data.

The amplifier may be configured to drive the transducer coil to generate an acoustic sound pressure wave.

The amplifier may be configured with a bandwidth from 20 Hz to 10 MHz.

The amplifier may comprise a first amplifier configured to drive the transducer coil to magnetically couple the apparatus to a further apparatus transducer for transferring data generate the magnetic field; and a second amplifier configured to drive the transducer coil to generate an acoustic sound pressure wave.

The first amplifier may be configured with a bandwidth from 20 kHz to 10 MHz, and the second amplifier may be configured with a bandwidth from 20 Hz to 20 kHz.

The apparatus may further comprise a modulator coupled to the amplifier, the modulator configured to generate a data signal for transferring to the further apparatus.

The modulator may comprise at least one of: a direct coding modulator; a frequency modulator; a time-division modulator; a phase modulator; an error detection modulator; and an error correction modulator.

The transducer may comprise at least one of: an earpiece transducer; an integrated hands free transducer; a headset transducer; and an hearing aid transducer.

The transducer configured to magnetically couple the apparatus to a further apparatus transducer for transferring data may be further configured to adaptively couple the apparatus to a further apparatus transducer for transferring data.

The adaptive coupling may comprise at least one of: adaptive data rate coupling; adaptive modulation coupling; and adaptive frequency coupling.

The transducer may comprise: a static magnet; and dynamic coil, wherein the dynamic coil may be biased at a first distance from the static magnet when the transducer is suitable for generating an acoustic sound pressure wave, and biased at a second distance greater than the first distance from the static magnet when configured to magnetically couple the apparatus to a further apparatus transducer for transferring data.

The apparatus may further comprise a biasing amplifier coupled to the transducer, wherein the biasing amplifier may be configured to provide a first current to bias the dynamic coil at the first distance from the static magnet, and a second current to bias the dynamic coil at the second distance.

According to a second aspect of the application there is provided an apparatus comprising: transducer means for magnetically coupling the apparatus to a further apparatus transducer for transferring data wherein the transducer means are suitable for generating an acoustic sound pressure wave.

The transducer means may comprise: means for generating a magnetic field for magnetically coupling the transducer to the further apparatus; and means suitable for generating the acoustic sound pressure wave, the means suitable for generating the acoustic sound pressure wave being coupled to the means for generating the magnetic field.

The transducer means may comprise: means for detecting a magnetic field for magnetically coupling the transducer to the further apparatus; and means suitable for generating the acoustic sound pressure wave, the means suitable for generating the acoustic sound pressure wave being coupled to the means for detecting a magnetic field.

The apparatus may further comprise means for detecting data within the magnetic field coupling.

The means for detecting data may comprise comparator means configured to detect the data within the magnetic field.

The means for detecting data may comprise: means for amplifying the transducer means output; and means for demodulating the data from the transducer means output.

The apparatus may further comprise amplifier means selectively coupled to the transducer means.

The amplifier means may further drive the transducer means to magnetically couple the apparatus to a further apparatus transducer means for transferring data.

The amplifier means may further drive the transducer means to generate an acoustic sound pressure wave.

The amplifier means may be configured with a bandwidth from 20 Hz to 10 MHz.

The amplifier means may further comprise: a first amplifier means for driving the transducer means to magnetically couple the apparatus to a further apparatus transducer means for transferring data; and a second amplifier means for driving the transducer means to generate an acoustic sound pressure wave.

The first amplifier means may be configured with a bandwidth from 20 kHz to 10 MHz, and the second amplifier means may be configured with a bandwidth from 20 Hz to 20 kHz.

The apparatus may further comprise means for modulating coupled to the means for amplifying, the means for modulating configured to generate a data signal for transferring to the further apparatus.

The means for modulating may comprise at least one of: a direct coding modulator; a frequency modulator; a time-division modulator; a phase modulator; an error detection modulator; and an error correction modulator.

The transducer means may comprise at least one of: an earpiece transducer; an integrated hands free transducer; a headset transducer; and an hearing aid transducer.

The transducer means configured to magnetically couple the apparatus to a further apparatus transducer means for transferring data may be further configured to adaptively couple the apparatus to a further apparatus transducer means for transferring data.

The adaptive coupling may comprise at least one of: adaptive data rate coupling; adaptive modulation coupling; and adaptive frequency coupling.

The transducer means may comprise: a static magnet; and dynamic coil, wherein the dynamic coil may be biased at a first distance from the static magnet when the transducer means is suitable for generating an acoustic sound pressure wave, and biased at a second distance greater than the first distance from the static magnet when configured to magnetically couple the apparatus to a further apparatus transducer means for transferring data.

The apparatus may further comprise means for biasing the transducer means, wherein the means for biasing the transducer means may be configured to provide a first current to bias the dynamic coil at the first distance from the static magnet, and a second current to bias the dynamic coil at the second distance.

According to a third aspect of the application there is provided a method comprising: providing a transducer configured to: magnetically couple the apparatus to a further apparatus transducer for transferring data; and being suitable for generating an acoustic sound pressure wave.

The method may further comprise detecting data within the magnetic field coupling the apparatus transducer to the further apparatus.

Detecting data within the magnetic field coupling may comprise comparing outputs of the transducer to detect the data within the magnetic field.

Detecting data within the magnetic field coupling may comprise: amplifying the transducer output; and demodulating the amplified transducer output.

The method may further comprise selectively coupling an amplifier to the transducer.

Selectively coupling the amplifier to the transducer may comprise selectively driving the transducer to magnetically couple the apparatus to a further apparatus transducer for transferring data.

Selectively coupling an amplifier to the transducer may comprise selectively driving the transducer to generate an acoustic sound pressure wave.

The amplifier may be configured with a bandwidth from 20 Hz to 10 MHz.

Selectively coupling an amplifier to the transducer may comprise: selectively coupling a first amplifier to drive the transducer to magnetically couple the apparatus to a further apparatus transducer for transferring data; and selectively coupling a second amplifier to drive the transducer to generate an acoustic sound pressure wave.

The first amplifier may be configured with a bandwidth from 20 kHz to 10 MHz, and the second amplifier may be configured with a bandwidth from 20 Hz to 20 kHz.

The method may further comprise generating a data signal for transferring to the further apparatus.

The transducer may comprise at least one of: an earpiece transducer; an integrated hands free transducer; a headset transducer; and an hearing aid transducer.

Magnetically coupling the apparatus to a further apparatus transducer for transferring data may comprise adaptively coupling the apparatus to a further apparatus transducer for transferring data.

Adaptively coupling may comprise at least one of: adaptive data rate coupling; adaptive modulation coupling; and adaptive frequency coupling.

The transducer may comprise: a static magnet; and dynamic coil, the method may further comprise: biasing the dynamic coil is biased at a first distance from the static magnet when the transducer is suitable for generating an acoustic sound pressure wave, and biasing the dynamic coil at a second distance greater than the first distance from the static magnet when magnetically coupling the apparatus to a further apparatus transducer for transferring data.

The method may further comprise: providing a first current to bias the dynamic coil at the first distance from the static magnet, and providing a second current to bias the dynamic coil at the second distance.

BRIEF DESCRIPTION OF DRAWINGS

For a better understanding of the present application and as to how the same may be carried into effect, reference will now be made by way of example to the accompanying drawings in which.

SOME EMBODIMENTS OF THE APPLICATION

The design parameters of low cost telecommunication equipment typically prevents the typical low cost phone from communicating locally and for example over any Near Field Communication (NFC) standard. Any 'short' distance data communication in such circumstances has to occur over the cellular communication system and thus uses significant cellular bandwidth with the associated cost to the user. Furthermore some low cost apparatus are only equipped with basic cellular communication transceiver modules such as 2G GSM standard or GPRS data communication protocol standards with slow or no data capacity. The application is thus based on the implementation of reusing available components such as speaker transducers, earpiece transducers, and headset transducers to magnetically couple to other transducers in order to communicate data between the transducers.

The following describes apparatus and methods for magnetically induction coupling apparatus to communicate data using a transducer suitable for generating audio signals.

Figure 1:
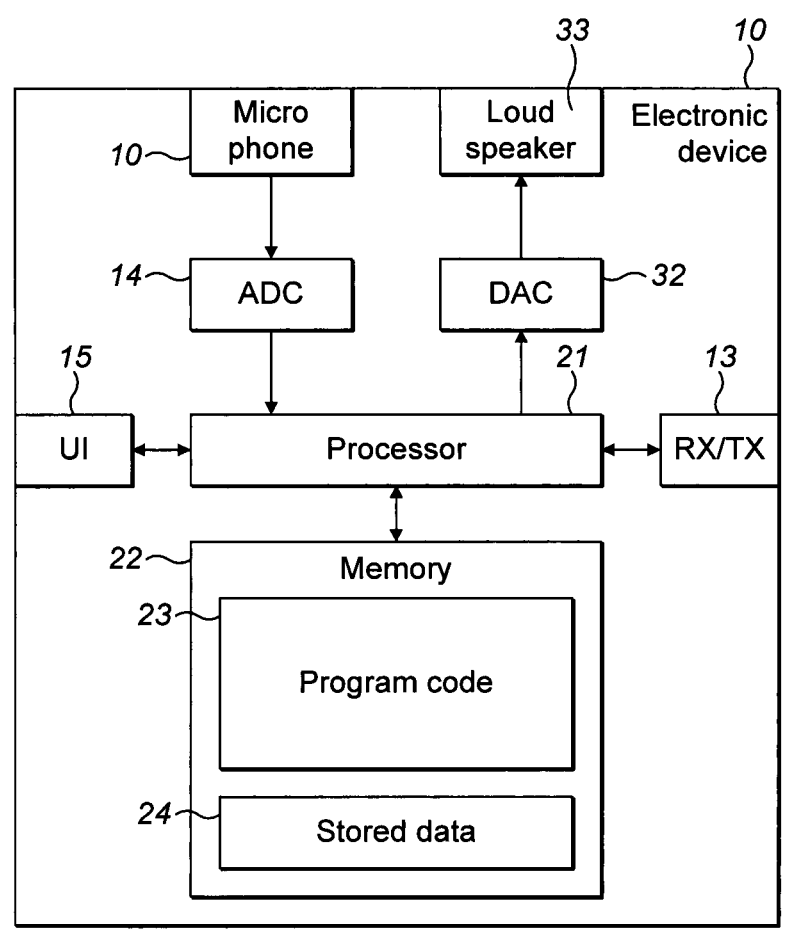
FIG. 1 illustrates a schematic block diagram of an apparatus according to some embodiments.

FIG. 1 discloses a schematic representation of an electronic device or apparatus 10 comprising a transducer or speaker 11. The transducer 11 may be an integrated speaker such as an integrated hands free speaker (IHF), loudspeaker or an earpiece. In some other embodiments the transducer can be integrated with the cover or another apparatus/phone part to form a speaker box.

The transducer 11 in some embodiments can be any suitable speaker type. For example in some embodiments the transducer can comprise a permanent magnet, or electromagnet moving coil transducer. Additionally or alternatively the transducer 33 comprises a multifunction device (MFD) component having any of the following; combined earpiece, integrated handsfree speaker, vibration generation means or a combination thereof.

The apparatus 10 in some embodiments can be a mobile phone, portable audio device, or other means for playing sound. The apparatus 10 has a sound outlet for permitting sound waves to pass from the transducer 11 to the exterior environment.

The apparatus 10 is in some embodiments a mobile terminal, mobile phone or user equipment for operation in a wireless communication system.

In other embodiments, the apparatus 10 is any suitable electronic device configured to generate sound, such as for example a digital camera, a portable audio player (mp3 player or similar), a portable video player (mp4 player or similar) and a portable computer, for example a laptop PC. In some other embodiments the apparatus 10 can be any suitable audio or audio subsystem component or any suitable audio capture/audio rendering device In some embodiments, the apparatus 10 comprises a sound generating module 19 which is linked to a processor 15. The processor 15 can be configured to execute various program codes. The implemented program codes may comprise a code for controlling the transducer 11 to inductively communicate with further apparatus and further in some embodiments to concurrently generate sound waves. In some embodiments the sound generating module 19 comprises a transducer protection module 20 for modifying the audio signals for the transducer 11.

The implemented program codes in some embodiments 17 can be stored for example in the memory 16 for retrieval by the processor 15 whenever needed. The memory 16 could further provide a section 18 for storing data, for example data that has been processed in accordance with the embodiments. The code can, in some embodiments, be implemented at least partially in hardware or firmware.

In some embodiments the processor 15 is linked via a digital-to-analogue converter (DAC) 12 to the transducer 11. The digital to analogue converter (DAC) 12 can be any suitable converter.

In some embodiments the DAC 12 sends an electronic audio signal output to the transducer 11 and on receiving the audio signal from the DAC 12, the transducer 11 generates acoustic waves. In other embodiments, the apparatus 10 receives control signals for controlling the transducer 11 from another electronic device.

The processor 15 can be further linked to a transceiver (TX/RX) 13, to a user interface (UI) 14 and to a display (not shown). The user interface 14 can enable a user to input commands or data to the apparatus 10. Any suitable input technology can be employed by the apparatus 10. It would be understood for example the apparatus in some embodiments could employ at least one of a keypad, keyboard, mouse, trackball, touch screen, joystick and wireless controller to provide inputs to the apparatus 10.

Figure 8A:
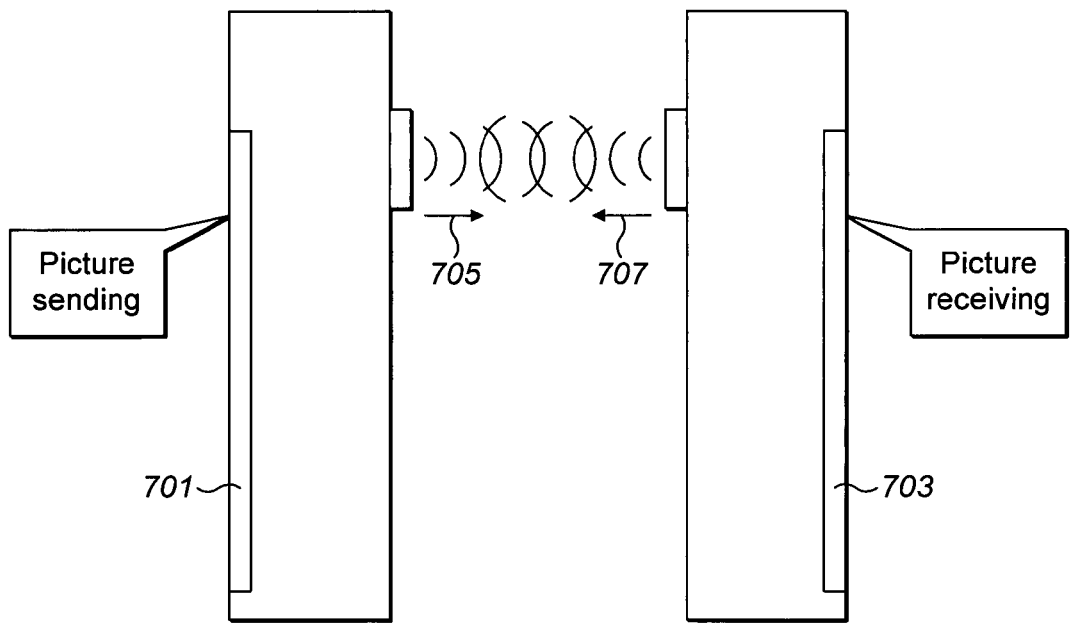
FIG. 8a illustrates a schematic view of a transmitter and receiver apparatus as communication apparatus suitable for near field communication according to some embodiments.

With respect to FIG. 8a a transmitter/receiver pair of apparatus are shown. The pair of apparatus is configured to transmit content and receive content respectively. In this example the transmitter apparatus 701 is configured to transmit content in the form of a picture to a receiver apparatus 703. However it would be understood that the data content can be any suitable content that is wished to be transferred from the transmitter apparatus 701 to the receiver apparatus 703. The content for example could comprise a file such as an MP3 or other format music file, video file, www link, business card, personal memo or any suitably encoded or compressed file of content. Furthermore in some embodiments the data can be streamed data in any suitable streaming format.

The operations of data coupling transmitting 705 and receiving 707 are further shown.

Figure 8B:
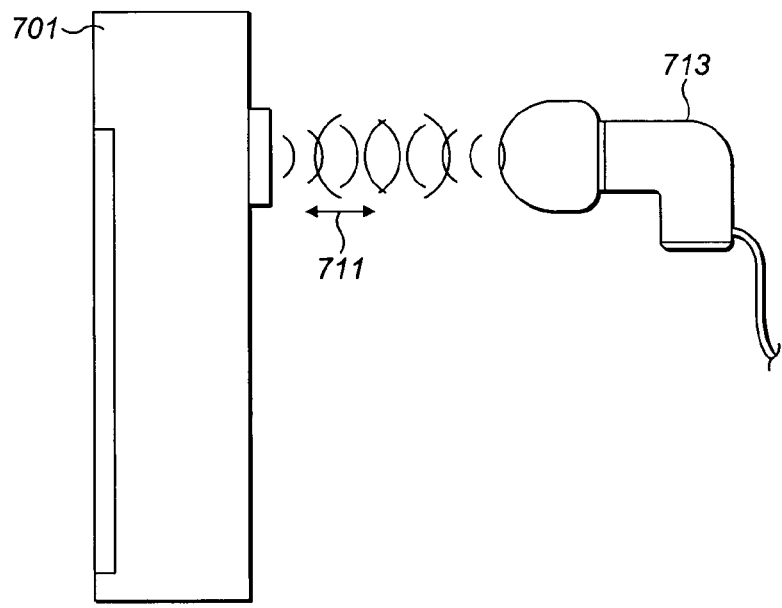
FIG. 8b illustrates a schematic view of a mobile apparatus to headset earpiece communication coupling suitable for near field communication according to some embodiments.

Furthermore with respect to FIG. 8b an example data coupling 711 between apparatus are shown, wherein the first apparatus is a user equipment and the second apparatus is an headset earpiece. The pair of apparatus is configured to transmit content and receive content respectively. In this example the transmitter apparatus 701 is configured to transmit content in the form of acoustic setup parameters to a receiver apparatus 713, for example the acoustic parameters can be used by the headset earpiece to enhance the acoustic properties of the headset when used to output acoustic signals. However it would be understood that the data content can be any suitable content that is wished to be transferred 711 from the transmitter apparatus 701 to the receiver apparatus 703. Although in the example described herein the user apparatus is the transmitter apparatus and the headset earpiece the receiver apparatus it would be understood that in some embodiments the headset apparatus can be the transmitter apparatus and the user apparatus the receiver apparatus. For example in some embodiments the headset can communicate to the user apparatus indicators identifying the headset and permitting the user apparatus to output audio signals with an improved equalisation to the headset to produce a better acoustic performance.

Figure 8C:
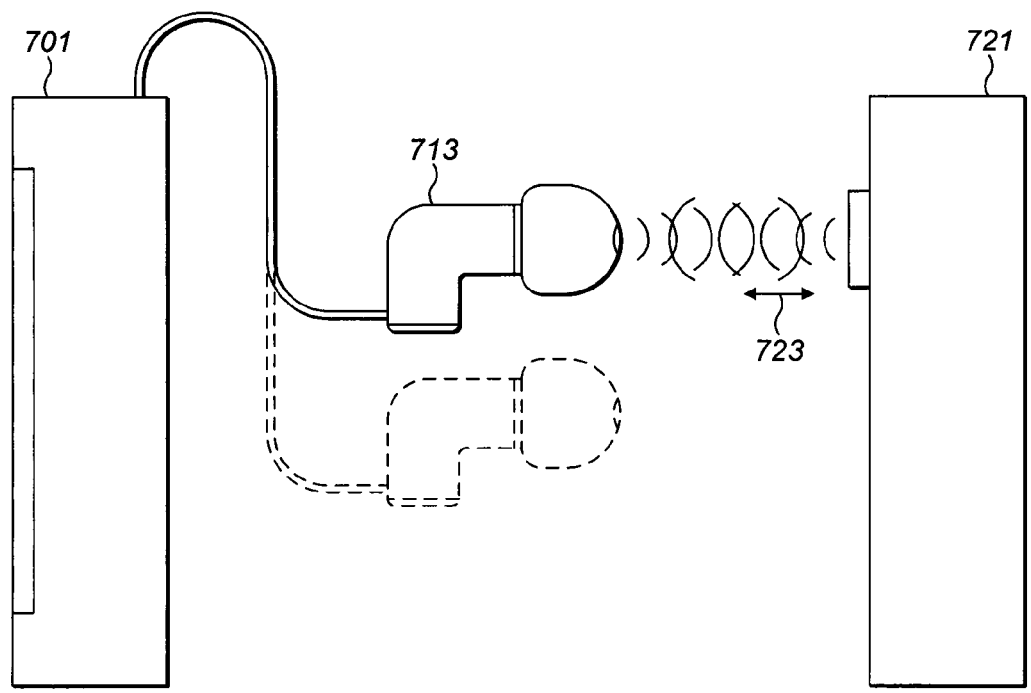
FIG. 8c illustrates a schematic view of a mobile apparatus/headset earpiece to headset earpiece communication coupling suitable for near field communication according to some embodiments.

With respect to FIG. 8c a further example data coupling 723 between apparatus are shown, wherein the transmitter apparatus comprises a headset earpiece wire coupled to a user equipment and the receiver apparatus comprises a user equipment. The pair of apparatus is configured to transmit content and receive content respectively. In this example the transmitter apparatus 713 coupled to the user equipment 701 can be configured to transmit content in the form of a picture to the receiver apparatus 721 with the advantage over the example shown in FIG. 8a that the two user equipment need not be brought close to each other. For example the operator of the user equipment can concentrate on the display on the user equipment informing the operator. For example the display can indicate when a coupling has been successful, and assisting selecting content to be sent. However it would be understood that the data content can be any suitable content that is wished to be transferred from the transmitter apparatus 713 to the receiver apparatus 721. The content for example could comprise a file such as an MP3 or other format music file, video file, www link, business card, personal memo or any suitably encoded or compressed file of content. Furthermore in some embodiments the data can be streamed data in any suitable streaming format. It would be understood that although the headset earpiece is shown as a mono headset, the headset earpiece can be any one earpiece of a stereo headset.

Figure 8D:
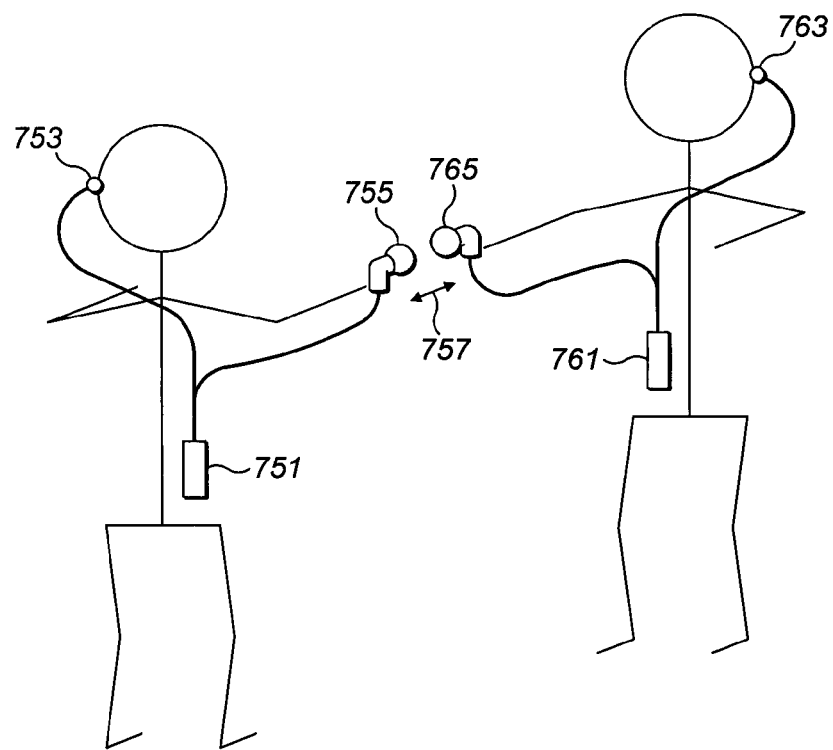
FIG. 8d illustrates a schematic view of a headset earpiece to headset earpiece communication coupling suitable for near field communication according to some embodiments.

Furthermore with respect to FIG. 8d a further example data coupling 757 between apparatus are shown, wherein the transmitter apparatus comprises a headset earpiece 755 physically coupled to a user equipment 751 and the receiver apparatus is a further headset earpiece 765 physically coupled to a user equipment 761. In the example shown in FIG. 8d the operator of the transmitter apparatus and receiver apparatus headsets can be stereo headsets and thus can in some embodiments be configured to output audio signals and data at the same time, or audio signals to one headset earpiece and data to the other headset earpiece of the headset. The pair of apparatus can be configured to transmit content and receive content respectively. In this example the transmitter apparatus 701 is configured to transmit any suitable content, for example a file such as an MP3 or other format music file, a data file comprising the music playlist of the transmitter apparatus, video file, picture file, www link, business card, personal memo or any suitably encoded or compressed file of content. Furthermore in some embodiments the data can be streamed data in any suitable streaming format.

In some embodiments the data coupling receiving apparatus can comprise any suitable magnetic field sensing apparatus. For example in some embodiments the transmitter apparatus can be a user equipment and the receiver apparatus can comprise a fixed coil (i.e. non-dynamic coil). For example in some embodiments a non-dynamic coil can comprise a conductive pathway or signal loop printed around the display window like a touch screen arrangement, a signal loop printed inside PWB or a traditional coil such as used for hearing aid compatibility (HAC) purposes. In other word in some embodiments of the application the magnetic coupling can be implemented between a speaker (moving coil) and a non-speaker arrangement (comprising any other traditional coil arrangement).

It would be understood that the above examples are not exhaustive and any suitable pairing of transducers can be implemented to communicate data of any suitable form between them.

Figure 9:
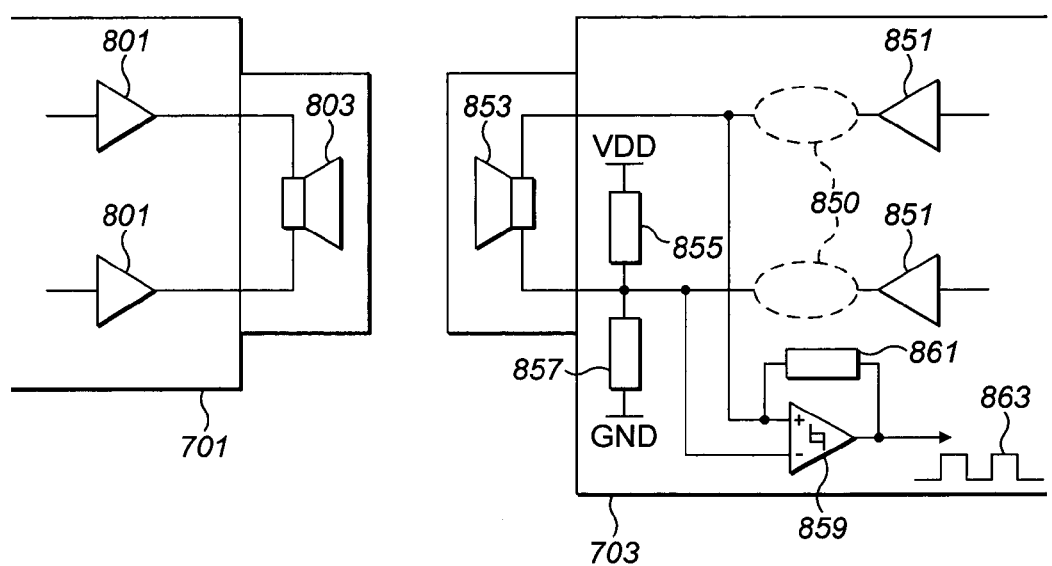
FIG. 9 illustrates a schematic view of a transmitter and receiver apparatus as shown in FIGS. 8a to 8d in further detail.

With respect to FIG. 9 the transmitter apparatus 701 and the receiver apparatus 703 are shown in further detail with respect to an example embodiment of the application. It would be understood that the transmitter apparatus 701 and receiver apparatus 703 can comprise both transmitter and receiver parts however for simplicity we have shown the transmitter apparatus 701 comprising transmitter parts and the receiver apparatus showing receiver parts only.

The transmitter apparatus 701 is shown comprising power amplifiers 801 configured to drive the 'one' or 'zero' state for magnetic data coupling. In some embodiments the magnetic data coupling 'zero' and 'one' states are provided by directly coupling the binary data bits to the amplifier as shown in the following example. However in some embodiments the binary data is encoded by a modulator/demodulator (or modem) configured to provide physical signals to amplifiers representing the 'zero' and 'one' data values. For example in some embodiments the modem uses a high-low ratio scheme to differentiate between a data 'zero' and data 'one' value, where a data 'one' bit is where the output is 60% high and 40% low and a data 'zero' bit has the opposite ratio of 40% high and 40% low.

In some embodiments the data 'one' and 'zero' values are Manchester coded or Miller coded versions of the data bit 'one' and 'zero' content data. In some other embodiments any suitable coding scheme can be employed such as for example phase shift key (PSK) coding, pulse width modulation (PWM) coding, on/off key (OOK) coding, frequency modulation (FM) coding, or amplitude modulation (AM) coding.

In some embodiments the power amplifiers 801 are configured to provide not only the data 'one' or 'zero' state signals but also to provide amplification for audio signals passed to the transducer 803. It will be understood and described herein that the data frequency range is located at a higher frequency than the audio range required by the transducer to produce audio signals. The power amplifiers 801 can be any suitable amplifier configured to receive the data and also the output of any audio subsystem and amplify these signals for the speaker transducer 803 and specifically to power the speaker coil. In such embodiments the power amplifiers 801 can be configured to amplify from 20 Hz to an upper cut off frequency well above the hearing range, for example 10 MHz.

In some embodiments the power amplifiers 801 can be separate from the audio power amplifier configured to amplify audio signals. The power amplifiers 801 can for example be configured to amplify signals from any suitable frequency range above the hearing cut off frequency, such as from 20 kHz to above (up to, for example, 10 MHz). In some embodiments a practical frequency range for such a power amplifiers can be between 100 kHz to 500 kHz.

In some embodiments the transmitter apparatus 701 can further comprise a speaker transducer 803 coupled to the power amplifiers and configured to produce the magnetic field required to couple the transmitter apparatus 701 to the receiver apparatus 703. The speaker transducer 803 coupled to the power amplifiers 801 can be configured to generate the acoustic or audio output as well as the magnetic field for data coupling concurrently, in other words the user can hear the audio output generated by the speaker transducer whilst a neighbouring receiver apparatus 703, speaker transducer 'detects' the higher frequency magnetic field fluctuations configured to transfer the content data.

The receiver apparatus 703 can further comprise power amplifiers 851 and a speaker transducer 853, however while the receiver apparatus is in a active receive mode the power amplifiers 851 can be disabled or decoupled (shown in FIG. 9 by area 850) from the transducer by floating the power amplifiers or implementing a high impedance (high-Z) coupling between the power amplifiers 851 and the speaker transducer 853.

The speaker transducer 853, and in particular the speaker transducer coil can be configured to detect the magnetic field generated by the transmitter apparatus speaker transducer 803 by means of mutual magnetic coupling. Mutual magnetic coupling occurs when an alternating current passing through a first coil generates a fluctuating magnetic field. The fluctuating magnetic field is detected in a neighbouring coil as the fluctuating magnetic field induces an alternating current in the neighbouring coil.

In some embodiments the receiver apparatus 703 comprises a clamping arrangement comprising a first resistor or impedance device 855 coupled between one output of the transducer 853 and the supply voltage rail (Vdd), a second resistor or impedance device 857 coupled between the first output of the transducer 853 and ground. The clamping arrangement thus prevents one side of the speaker transducer coil from floating since the power amplifiers are inactive. Furthermore the clamping arrangement provides an oscillation damping function and will help to maintain stable digital state at the output of the receiving amplifier after a strong-enough magnetic signal from the transducer has been stopped or the connection has been lost.

The receiver apparatus 703 can further comprise an analogue comparator with hysteresis 859. The analogue converter with hysteresis 859 can comprise a negative input coupled to the first output of the transducer 853 and a positive input coupled to the second output of the transducer 853. The comparator 859 can further be configured to operate in a feedback mode by coupling a further impedance device 861 across from the output of the comparator to the positive input of the comparator. The output of the analogue comparator 859 can thus produce a signal 863 which is a digital amplified output of the signal received by the transducer 853 via the magnetic coupling between the transmitter apparatus 701 and the receiver apparatus 703.

Figure 10A:
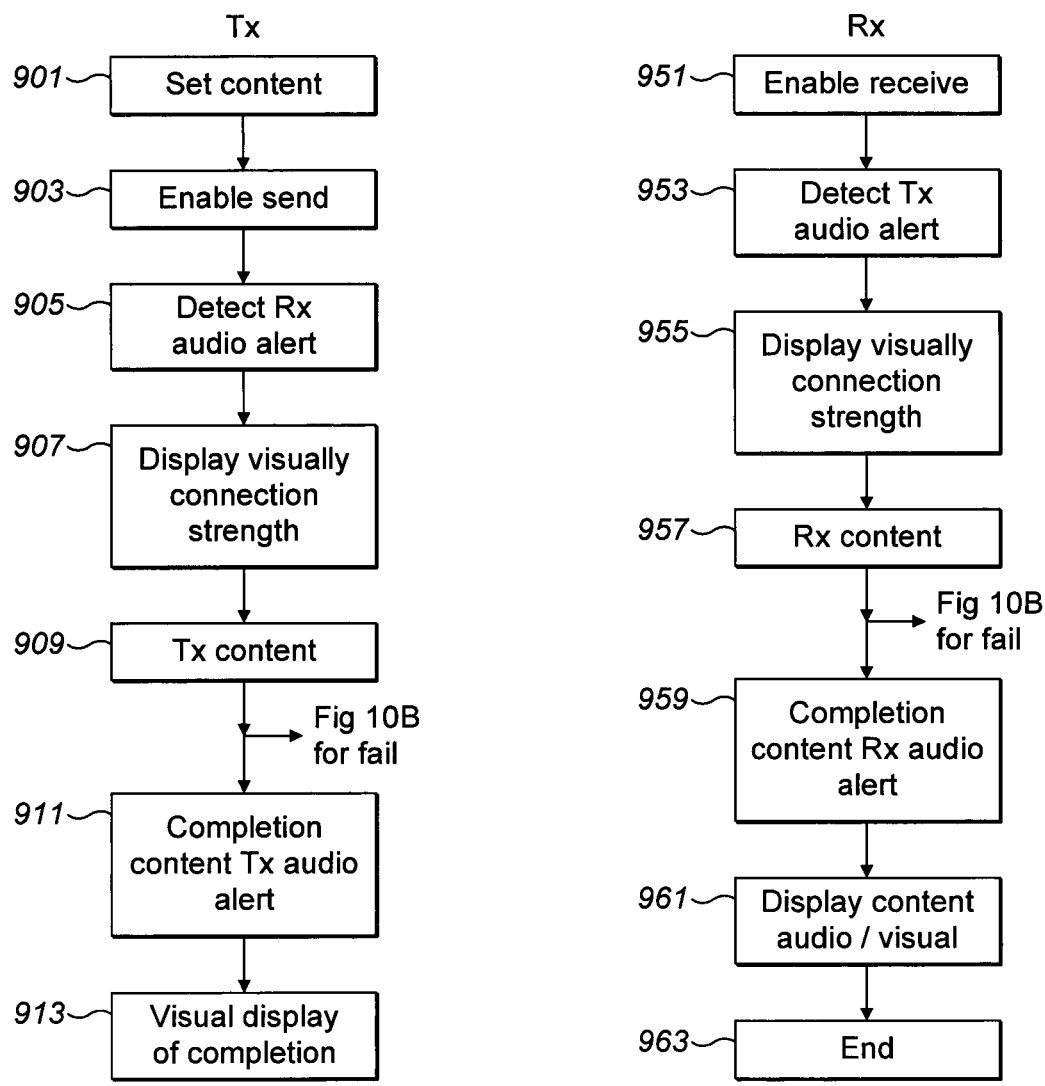
FIGS. 10a and 10b illustrates a flow diagram showing initialisation, coupling, successful content transfer, and failure of content transfer between the apparatus as shown in FIGS. 8a to 8d and 9.
Figure 10B:
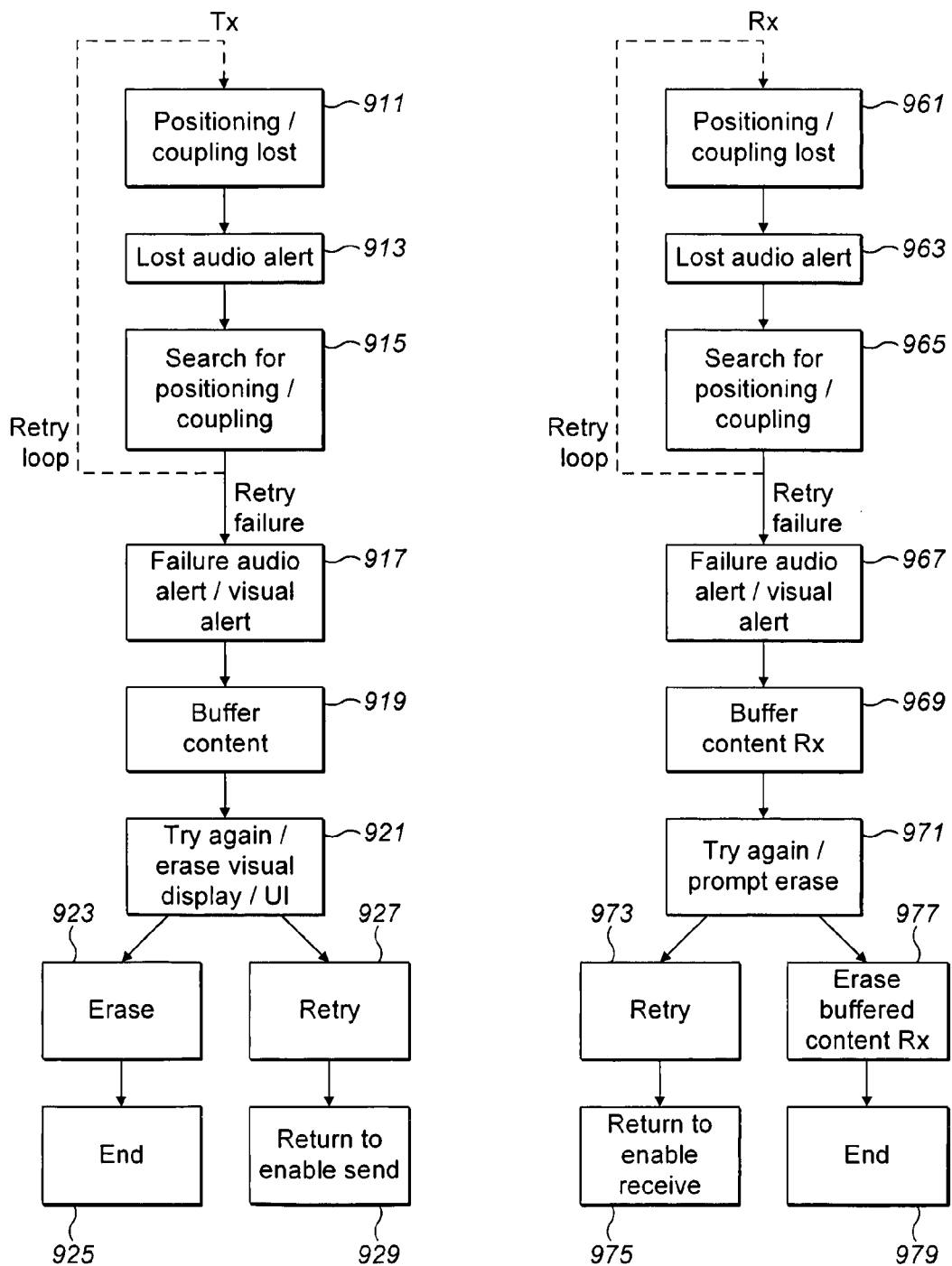

An example transmission and reception of content with respect to the transmitter apparatus 701 and receiver apparatus 703 is shown with respect to the flow diagrams shown in FIGS. 10a and 10b. With respect to FIG. 10a an example of successful communication of content is shown, wherein with respect to FIG. 10b the unsuccessful communication of content is shown.

In some embodiments the transmitter apparatus 701 can be configured to set the content, in other words, using the user interface or other means the data to be transmitted is selected. In the following example, the content is a picture to be sent from the transmitter apparatus 701 to the receiver apparatus 703.

The operation of setting the content is shown in FIG. 10a by step 901.

The transmitter apparatus 701, and in some embodiments, for example, the user interface of the transmitter apparatus can be configured to enable the sending of the content. For example, in some embodiments the sending of the content can be enabled by a manual selection or operation of the user interface, such as a key press to send the content. Furthermore in some embodiments the sending of the content can be enabled semi-automatically or automatically such as for example by use of a timer or other sensor related transmission.

The operation of enabling the sending of the content is shown in FIG. 10a by step 903.

Furthermore, the receiver apparatus 703 can be enabled to receive the content using a similar manual user interface approach, and/or a semi-automatic or an automatic enabling.

The operation of enabling the receiver apparatus 703 is shown in FIG. 10a by step 951.

The transmitter apparatus 701 can furthermore be configured to detect when the receiver apparatus 703 is within range. In some embodiments the detection of the receiver apparatus further is configured to enable the transmitter apparatus to generate or emit an audio alert.

The detection of the receiver apparatus 703 can be, for example, a detection of a sequence of pulses or signals from the receiver, or the receiver apparatus responding to/acknowledging a detection signal from the transmitter apparatus.

The operation of detecting the receiver apparatus and generating or emitting the audio alert is shown in FIG. 10a by step 905.

Similarly the receiver apparatus 703 can in some embodiments be configured to detect the transmitter apparatus 701. In such embodiments the receiver apparatus 703 can also be configured to generate or emit an audio alert. The detection of the transmitter apparatus 701 can be for example detecting a transmitter apparatus 701 signal requesting the coupling or connection to be made.

The operation of detecting the transmitter apparatus 703 and the generation of the audio alert is shown in FIG. 10a by step 953.

In some embodiments the transmitter apparatus 701 and the receiver apparatus 703 can be configured to display visually the connection strength. In such embodiments the transmitter apparatus 701 and the receiver apparatus 703 are configured to transmit to each other a standard or defined signal strength which is received at the other apparatus to indicate the signal strength received and thus the connection strength between the two apparatus. In some embodiments this connection strength can be displayed visually.

The operation of displaying visually the connection strength at the transmitter apparatus is shown in FIG. 10a by step 907.

Furthermore the operation of displaying visually the connection strength at the receiver apparatus is shown in FIG. 10a by step 955.

The transmitter apparatus 701 on detecting the receiver apparatus 703 can in some embodiments be configured to transmit the content from the transmitter apparatus 701 to the receiver apparatus 703. In some embodiments the transmission is initiated dependent on both detection and significant connection strength to permit the data to have a sufficiently high probability of successful transmission. Furthermore in some embodiments the transmission is dependent on the connection strength. For example in some embodiments the transmitter apparatus 701 and receiver apparatus 703 can negotiate a maximum data rate or negotiate an error detection/correction coding can be applied to the content data dependent on the signal strength. In such embodiments a higher rate coding can thus be applied to a stronger coupling and lower rate coding applied to a weaker coupling. Furthermore in such embodiments a strong error detection/correction coding can be applied to the signal where the coupling or signal connection strength is weak.

The operation of transmitting the content is shown in FIG. 10*a* by step 909.

Furthermore the receiver apparatus 703 can be configured in some embodiments to receive the content transmitted by the transmitter apparatus 701.

The operation of receiving the content is shown in FIG. 10*a* by step 957.

The remainder of FIG. 10*a* then describes the operations where the transmission and reception of the content is successful, with respect to FIG. 10*b* the operations where the transmission and reception of the content fail are further described later.

The transmitter apparatus 701, in some embodiments, following a completion of the content transmission can be configured to generate a completion audio alert.

The generation of a completion audio alert operation is shown in FIG. 10*a* by step 911.

Furthermore in some embodiments the receiver apparatus 703 can in some embodiments be configured to generate an audio alert on determining that the content has been received successfully.

The operation of generating a completion content reception audio alert is shown in FIG. 10*a* by step 959.

Furthermore in some embodiments the transmitter apparatus 701 can be configured to generate a visual display that the transmission has completed.

The operation of displaying a visual representation of the transmission completion is shown in FIG. 10*a* by step 913.

Furthermore in some embodiments the receiver apparatus 703 can be configured to display the content, or display information indicating that the content has been successfully transferred to the receiver.

The operation of displaying the content (in audio or visual form) is shown in FIG. 10*a* by step 961.

Furthermore the receiver apparatus 703 can then complete the reception operation.

The completion/end step is shown in FIG. 10*a* by step 963.

With respect to FIG. 10*b* the operation of the content transfer from the transmitter apparatus 701 to the receiver apparatus 703 following a failure of transmission is described in further detail.

The transmitter apparatus 701 can be configured in some embodiments to determine when the positioning or coupling is lost, for example by receiving an error acknowledgement message from the receiver apparatus 703 or failing to receive an acknowledgment message from the receiver apparatus 703.

The operation of determining that the positioning or coupling is lost is shown in FIG. 10*b* by step 911.

In some embodiments the transmitter apparatus 701 can then be configured to generate a lost connection audio alert.

The generation of the lost audio alert is shown in FIG. 10*b* by step 913.

The transmitter apparatus 701 can then be configured to generate a coupling/positioning search. For example the transmitter apparatus 701 can be configured to transmit an "I'm here" message to be sent to the receiver apparatus 703 which prompts the receiver apparatus 703 to reply to the message. In some embodiments the search for positioning/coupling can be performed by retransmitting the last transmitted data or the data following the last known received data.

The search for positioning/coupling operation can be seen in FIG. 10*b* by step 915.

In some embodiments where the search for positioning/coupling fails, the transmitter apparatus 701 can perform a retry loop wherein the transmitter apparatus passes back to the positioning/coupling lost operation. In some embodiments the retry loop can be configured to be performed a set or defined number of times, or be performed for a defined length of time (for example until a timing interrupt occurs).

A similar series of operations can be performed with regards to the receiver apparatus 703. Thus the receiver apparatus 703 can be configured to determine when positioning/coupling is lost, for example by detecting an error in the received signal, or by failing to detect the signal, or detecting a signal below a threshold detection level.

The receiver apparatus 703 positioning/coupling lost determination operation is shown in FIG. 10*b* by step 961.

Furthermore the receiver apparatus 703 can be configured on determining that the positioning/coupling has been lost to generate a lost audio alert signal.

The operation of generating the lost audio alert signal is shown in FIG. 10*b* by step 963.

Furthermore the receiver apparatus 703 can be configured to perform a further search for positioning/coupling. For example, as shown with regards to the transmitter apparatus 701, the receiver apparatus 703 can be configured to "listen out" for a transmitter signal, or be configured to transmit a signal to the transmitter apparatus 701. In a manner similar to the transmitter apparatus 701 the receiver apparatus 703 can also perform a retry loop a number of times or continue to try and receive the content until a timing interrupt occurs.

The transmitter apparatus 701 can then determine after a certain number of retries or after a timing interrupt has occurred that the failure of transmission has occurred. In such embodiments the transmitter apparatus 701 can be configured to generate a failure audio alert and/or visual alert.

The generation of a failure alert is shown in FIG. 10*b* by step 917.

Similarly, the receiver apparatus 703 can be configured to further generate a failure alert.

The generation of at the receiver apparatus of a failure alert is shown in FIG. 10*b* by step 967.

The transmitter apparatus 701 can be configured in some embodiments, on determining a failed connection, to buffer the content to be sent to the receiver apparatus 703.

The operation of buffering the content to be transmitted to the receiver apparatus 703 is shown in FIG. 10*b* by step 919.

Similarly, the receiver apparatus 703 can also be configured to buffer the content that has correctly been received.

The buffering of the received content is shown in FIG. 10*b* by step 969.

In some embodiments the transmitter and/or receiver apparatus can be configured to then provide an indicator to the user asking or requesting the user to determine whether or not the operation is to be tried again. In some embodiments furthermore the user interface can display an option asking to erase the information currently being held in the transmitter apparatus 701 buffer and/or receiver apparatus 703 buffer.

The operation of the user interface request for trying again with regards to the transmitter apparatus is shown in FIG. 10*b* by step 921. Furthermore the 'try again' operation with regards to the receiver apparatus 703 is shown in FIG. 10*b* by step 971.

On determining that the transmitter apparatus 701 is to try again the operation can be then configured to retry the operation from the start.

The initialisation of retrying is shown in FIG. 10*b* by step 927.

Furthermore the operation then returns to the step or operation of enabling the sending of information step 903.

The returning to the enable send operation is shown in FIG. 10*b* by step 929.

Where in embodiments of the application the transmitter apparatus 701 user interface request is responded to with an erase signal the transmitter apparatus 701 can be configured to erase the information currently in the transmit buffer.

The operation of erasing the information in the transmit buffer is shown in FIG. 10*b* by step 923.

Furthermore the erasure of the information in the transmit buffer can trigger the transmitter apparatus 701 to be configured to end the transfer of content operations.

The ending of the content transmission operation is shown in FIG. 10*b* by step 925.

Similarly the receiver apparatus 703 can be configured on selection of a 'retry' user interface input to perform a retry operation initialisation.

The retry operation initialisation step is shown in FIG. 10*b* by step 973.

The receiver apparatus 703 can then having been indicated to retry be configured to cause the content transfer (receive) operation to restart at the enable receive operation as shown in FIG. 10*a* by step 951.

The return to the enable receive operation is shown in FIG. 10*b* by step 945.

Furthermore in some embodiments when the receiver apparatus receives a suitable 'erase' input the receiver apparatus 703 can be configured to erase the buffered content.

The operation of erasing the buffered content is shown in FIG. 10*b* by step 977.

Furthermore the erasure of the buffered content can then trigger the receiver apparatus 703 to end the receiving operation.

The ending of the receiving operation is shown in FIG. 10*b* by step 979.

Figure 2:
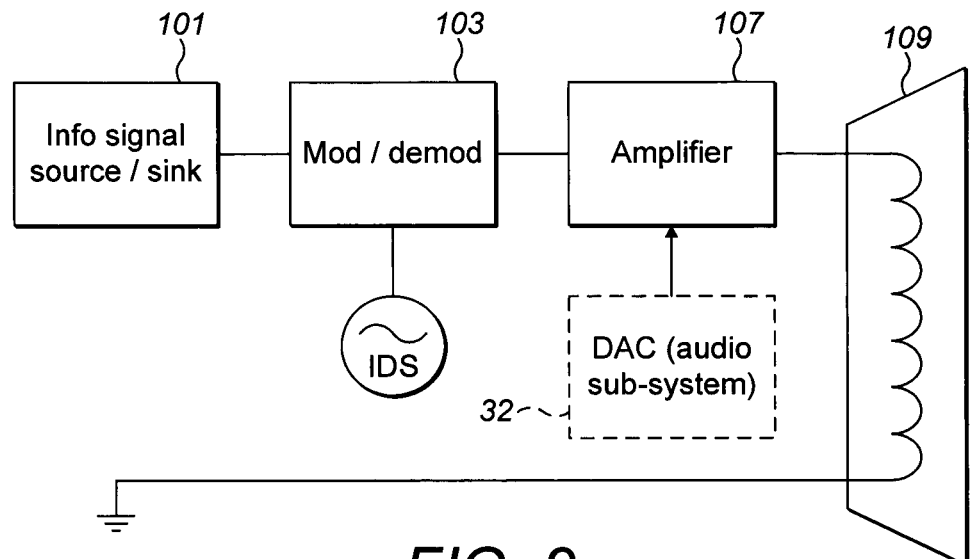
FIG. 2 illustrates a schematic diagram of an apparatus incorporating near field communication using a speaker as an antenna according to a first embodiment.

With respect to FIG. 2, the apparatus shown in FIG. 1 is shown in further detail with respect to a schematic view of a block diagram apparatus suitable for implementing both the role of transmitter apparatus and receiver apparatus according to some embodiments of the application. The apparatus 10 can in some embodiments comprise an information signal source or sink 101. The information signal source or sink 101 can, in some embodiments, be considered to represent the origin and/or the terminus of data. For example the information signal source can be a program which encapsulates a file or generates data to be streamed or passed to another or further apparatus. The information signal sink can similarly be a program or component configured to receive data either in discrete or streamed form. The information signal source/sink 101 can in some embodiments represent memory devices containing suitably encoded files or data to be output (information source) or awaiting data (information sink).

Figure 3:
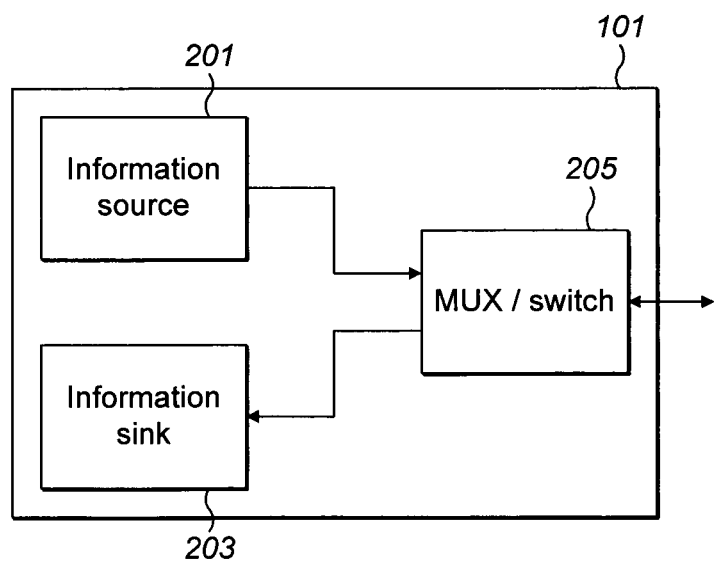
FIG. 3 illustrates a schematic diagram of the information source/sink as shown in FIG. 2 in further detail according to some embodiments.

With respect to FIG. 3, the information source/sink 101 is shown in further detail according to some embodiments. The information source/sink 101 can in some embodiments comprise an information source 201. The information source 201 can be configured to, as described above, be any suitable representation of generated data such as a program or physical component. The information source 201 can be configured in some embodiments to be coupled to a multiplexer or switch 205 which can select to output the data generated by the information source 201 to the modulator/demodulator 103.

In some embodiments the information source/sink can further comprise an information sink 203. The information sink can, as described above, be any suitable embodiment of a component or program configured to receive data via the magnetic induction communication system described herein. In some embodiments the information sink 203 can be configured to be coupled to the multiplexer/switch 205.

In some embodiments the information source/sink 101 can further comprise a multiplexer/switch 205 coupled to the information source and information sink and further coupled to the modulator/demodulator 103. The output/switch 205 can be configured to operate in a half duplex, or simplex manner dependent on the current mode of operation of the apparatus. Thus in some embodiments where the apparatus is being used only as a transmitter or receiver the multiplexer/switch 205 can couple one of the information source 201 or information sink 203 to the modulator/demodulator. Furthermore in some embodiments where the apparatus is used as both transmitter and receiver either at the same time or using time division multiplexing the multiplexer/switch 205 can be configured to couple with the information source and the information sink to the modulator/demodulator one at a time (for half duplex communication).

In some embodiments the apparatus further comprises a modulator/demodulator 103. The modulator/demodulator (or modem) 103 can in some embodiments be configured to receive the data from the information signal source/sink 101 and modulate the information data using any suitable modulation scheme. Similarly the modulator/demodulator 103 can in the configured to receive modulated signals and process these to form is modulated data signals. The term modulation as used herein can be understood to cover any suitable operation performed by any suitable means for processing the information source signal by suitable means to transfer the content formed from the information source from the transmitter apparatus to the receiver apparatus. For example in some embodiments modulation can be understood to be a 'direct transformer coupled' digital signal, as shown with respect to embodiments described with respect to FIG. 9, wherein the information source or content signal clocked at a sufficiently high frequency to prevent audio signal interference can be passed to the transducer (transformer) coil to generate a magnetic field which can be sensed by the receiver apparatus. In some embodiments the 'clocking' can be considered to be a modulation as the information signal in the form of the content is modulated onto a clock signal.

Modulation furthermore in some embodiments can comprise the application of processing or encoding the information source signal to improve the error correction/error detection performance of the content transfer operation.

In some embodiments the modem 103 can be "self clocking'". Furthermore in some embodiments the modem 103 can be any suitable universal asynchronous receive transmit (UART) compatible device. In some embodiments the modem 103 can be a UART configured to receive a continuous clock signal and be configured to employ a high-low ratio modulation scheme. For example in some embodiments the modem 103 outputs a high bit where the output is 60% high and 40% low while a low bit has the opposite ratio of 40% high and 40% low.

The modulator/demodulator 103 can in some embodiments be configured to be coupled to an amplifier 107.

Furthermore the modem 103 can in some embodiments be configured to receive data which is modulated and apply a suitable demodulation to obtain the original data.

The term demodulation as used herein can be understood to cover any suitable operation performed by any suitable means for processing the modulated (encoded) signal received from the transmitter apparatus by any suitable means to determine the content from the received signal. For example in some embodiments demodulation can be understood to be a 'direct transformer coupled' detector wherein the signal received from the comparator is a clocked content data signal, as shown with respect to embodiments described with respect to FIG. 9.

In some embodiments the modulator/demodulator 103 can apply error detection/error correction detection on the received signals.

In some embodiments the modem 103 further can be configured to perform data flow management. For example in some embodiments detecting an error in the receiver apparatus data can be configured to an error message can be generated and passed back to the further apparatus.

Figure 4:
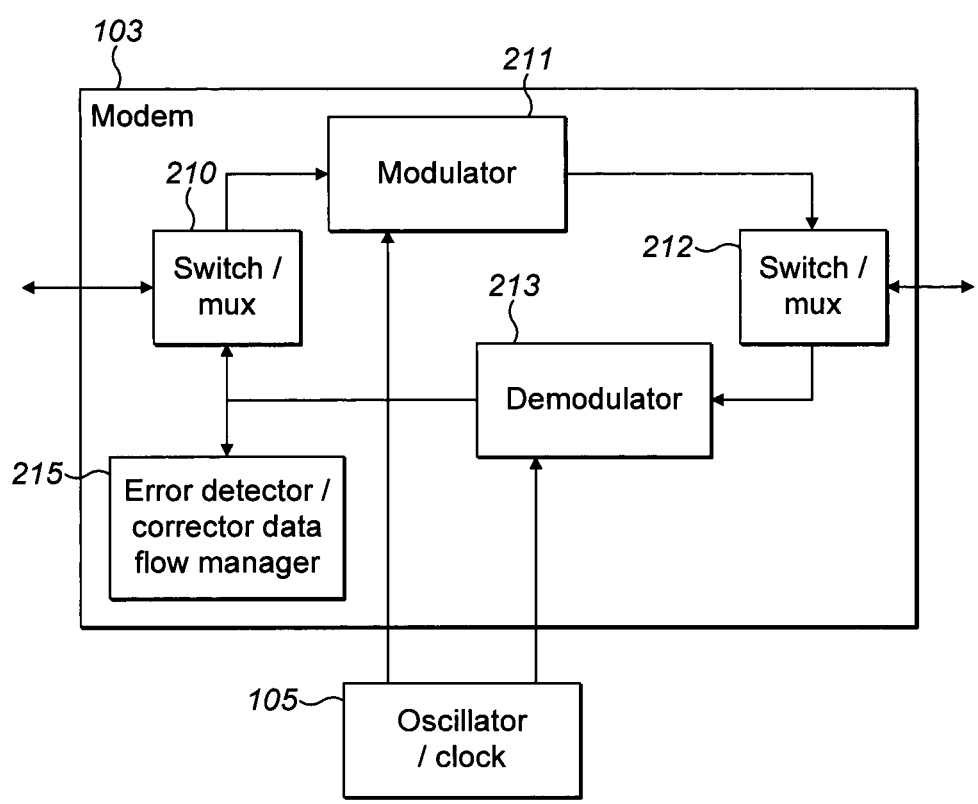
FIG. 4 illustrates a schematic diagram of the modulator/demodulator as shown in FIG. 2 in further detail according to some embodiments.

With respect to FIG. 4 an example of the modem 103 is shown according to some embodiments. The example modem 103 shown in FIG. 4 shows a single coupling from the modem 103 to the information source/sink 101, and a similarly a single coupling from the modem 103 to the amplifier 107. However it will be appreciated that in some embodiments the bidirectional flow can be separated such that there can be a first directional dataflow coupling and an opposite directional dataflow coupling between the modem 103, and the information source/sink and the amplifier 107. In such examples the directional flow examples need not comprise the switch/multiplexer components as data flow is regulated by the separate input and output couplings.

In some embodiments the modem 103 comprises a first switch/multiplexer 210 configured to couple the modem 103 and the information source/sink 101 and further distribute receive data to the modulator 211 and distribute data from the demodulator 213 to the information sink.

In some embodiments the modem 103 comprises a modulator 211. The modulator 211 can be implemented either in hardware or software on a processor. The modulator 211 can implement any of the example modulation schemes described herein. In some embodiments the modulator 211 can be configured to receive an oscillator or clock generated signal from the oscillator/clock 105. The modulator 211 can further be configured to output a modulated data signal to the second switch/multiplexer 212.

In some embodiments the modem 103 can further comprise a demodulator 213 configured to perform demodulation and also be implemented either in hardware or software operating on a processor. The data modulator 213 can be configured to output a demodulated data signal to the switch/multiplexer 210 for forwarding to the information sink and further be coupled to an error detector/corrector/dataflow manager 215.

In some embodiments the modem 103 can comprise an error detector/corrector/dataflow manager 215. The error detector/corrector/dataflow manager 215 can be configured to perform any suitable error detection/correction/dataflow management as described herein. In some embodiments the error detector/corrector/dataflow manager can be configured to output their error detection message to be processed by the modulator and passed back to the original source of the data.

In some embodiments the modem 103 comprises a second switch/multiplexer 212 configured to be coupled to the modulator and configured to receive modulated data signals suitable to be output to the amplifier 107, and further to receive amplified signals from the amplifier 107 and switch or multiplex these to the demodulator 213 dependent on the mode of operation of the apparatus.

In some embodiments the apparatus further comprises an oscillator/clock 105. The oscillator/clock 105 can be configured to supply the modulator/demodulator 103 a signal suitable for modulating/demodulating the received signals. The oscillator/clock 105 can be any suitable oscillator or clock signal generator implementation.

In some embodiments the apparatus further comprises an amplifier 107. The amplifier 107 can be any suitable amplifier configured to receive the output of the modulator/demodulator 103 and also the output of any audio subsystem and amplify these signals for the transducer speaker coil 109. In such embodiments as described herein the amplifier can be configured to amplify from 20 Hz to an upper cut off frequency well above the hearing range, for example 1 MHz.

In some embodiments the amplifier 107 can be separate from the audio power amplifier configured to amplify audio signals. The amplifier 107 can for example be configured to amplify signals from any suitable frequency range above the hearing cut off frequency.

The amplifier 107 can furthermore in some embodiments be configured to receive the output from the transducer speaker coil 109, amplify such signals and pass these to the demodulator of the modulator/demodulator 103 for demodulating. This amplifier frequency range can also be above the hearing cut off frequency, such as from 20 Hz and above.

Figure 5:
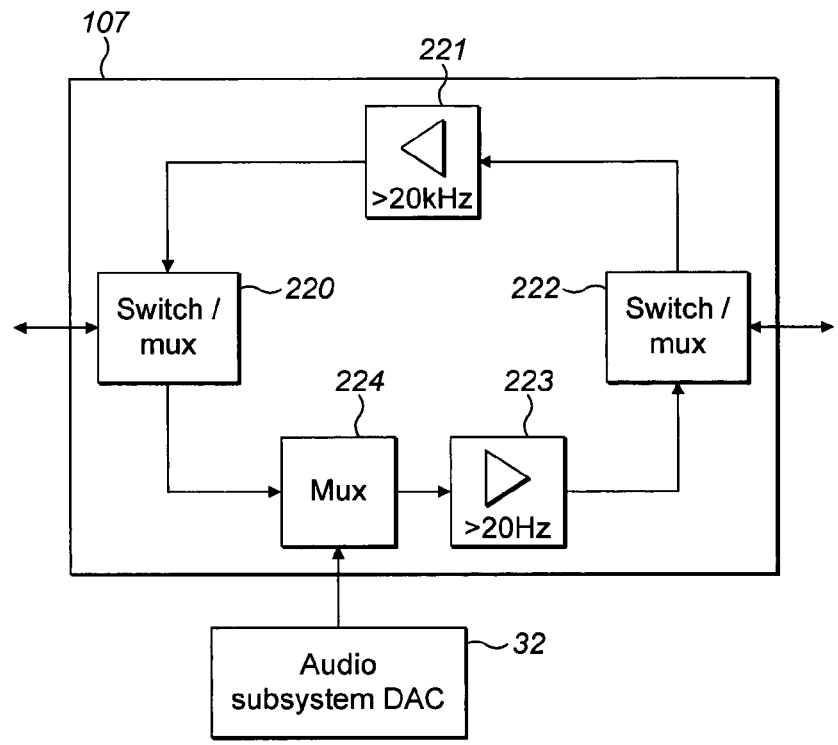
FIG. 5 illustrates a schematic diagram of the amplifier as shown in FIG. 2 in further detail according to some embodiments.

With respect to FIG. 5 an example implementation of the amplifier according to some embodiments is shown.

The amplifier 107 in some embodiments comprises a first switch/multiplexer 220 configured to couple the amplifier 107 to the modulator/demodulator 103. The switch/multiplexer 220 is configured to couple incoming signals from the modulator/demodulator 103 to the data/audio multiplexer 224 and further couple the input amplifier 221 to the modulator/demodulator 103 such that dataflow is controlled according to the mode of operation of the apparatus.

In some embodiments the amplifier 107 further comprises a data/audio multiplexer 224 configured to receive the data from the modulator component of the modulator/demodulator 107 via the switch/multiplexer 220 and also receive the audio subsystem audio signal, for example via the audio subsystem digital to analogue converter 32. The multiplexer 224 can then be configured to output a combined data and audio signal to an output amplifier 223.

In some embodiments the amplifier 107 further comprises an output amplifier 223. The output amplifier 223 can be configured to output a signal combination of the data/audio signal which is amplified. In some embodiments the output amplifier 223 comprises a wideband amplifier with a frequency range from approximately 20 Hz upwards to the modulated data cut off frequency and above. The output of the output amplifier 223 can be passed to the second switch/multiplexer 222.

In some embodiments the amplifier 107 further comprises an input amplifier 221. The input amplifier 221 can be configured to receive signals from the switch/multiplexer 222 received from the transducer speaker coil 109 and amplify these signals. The frequency range of the input amplifier 221 can thus be any suitable frequency range such as described above. The input amplifier 221 can output the amplified received data signal to the switch/multiplexer 220 for distribution to the modulator/demodulator 103.

In some embodiments the amplifier 107 further comprises a switch/multiplexer 222 configured to couple the input amplifier 221, output amplifier 223, and the speaker coil. The switch/multiplexer 222 in some embodiments can be implemented as a bidirectional filter whereby signals received from the transducer speaker coil 109 are high frequency band filtered and passed to the input amplifier 221 wherein the signals received from the output amplifier 223 are passed via a separate filter to the speaker coil 109. It would be appreciated that in some embodiments the output amplifier 223 can be implemented by separate audio and data amplifier components which are then filter combined by the switch/multiplexer 222.

In some embodiments the apparatus further comprises a transducer 109. The transducer as described herein can be any suitable transducer comprising a speaker coil suitable for generating a magnetic field or alternating electrical field (for the generation of magnetic data induction communication and audio acoustic wave generation), and further be suitable for receiving and/or detecting and magnetic field/electrical field (for the reception of magnetic induction communication).

Figure 7:
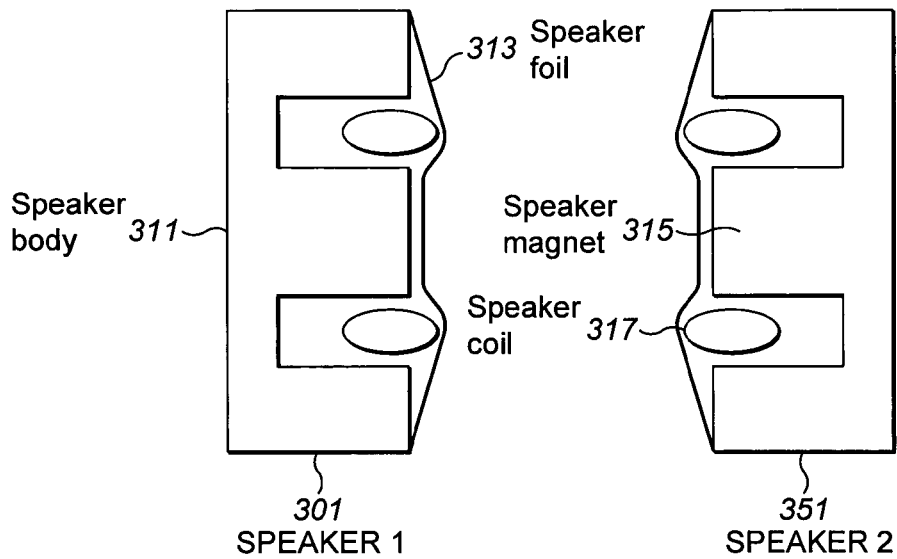
FIG. 7 illustrates a view of two apparatus arranged side-by-side suitable for near field communication according to some embodiments.

With respect to FIG. 7 a schematic view of a pair of transducers (which in this example are a pair of speakers) is shown. In the example shown in FIG. 7, two separate apparatus or devices, the first apparatus is shown with speaker 1 301 and the second apparatus is shown by speaker 2 351, with the speaker coils located adjacent to each other in such a way that the magnetic fields generated by one of the two speakers induce a magnetic field in the other speaker, in other words magnetically coupling the two speakers. It has been shown that magnetic coupling can occur even if the two speakers are not completely in line with each other with, in some embodiments acceptable magnetic coupling can be considered to be where there is 50% speaker overlap.

Each speaker in some embodiments comprises a speaker body 311 which can comprise a permanent magnet 315 or electromagnetic material which can be configured to provide a suitable static magnetic field. Furthermore the speaker can comprise a speaker coil 317 which on application of a suitable current generates an electrical field (and when the current is variable a further magnetic field) which reacts to the speaker body static magnetic field causing the speaker coil to move. The speaker further comprises a speaker foil 313 or diaphragm physically coupled to the coil which when the speaker coil moves causes the speaker foil 313 to move thus generating acoustic waves suitable for hearing. Furthermore as discussed herein the speaker coil can be configured to generate by an alternating current at a frequency higher than human hearing frequencies an electrical/magnetic field which is received at the second speaker coil by means of field coupling and is suitable for data transmission.

Figure 6:
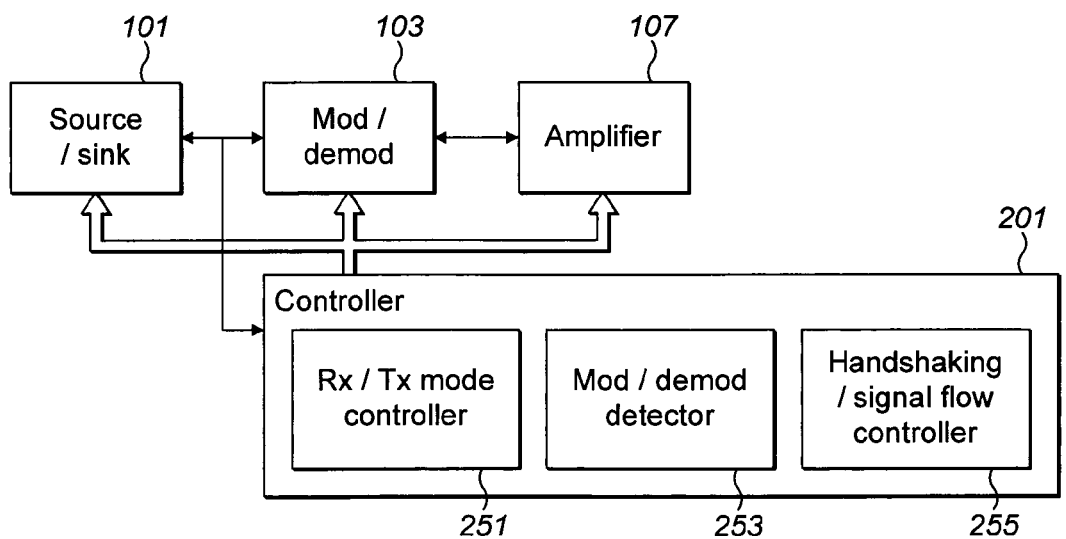
FIG. 6 illustrates a schematic view of the control system of an apparatus according to some embodiments.

With respect to FIG. 6 the control of the apparatus with respect to near field communication and audio signal generation implemented in embodiments of the application is shown. The apparatus is shown comprising as described herein with respect to FIGS. 2 to 5, the chaining of apparatus components comprising the information signal source/sink 101 coupled to the modulator/demodulator 103, and the modulator/demodulator 103 in turn coupled to the amplifier 107. Furthermore the apparatus comprises a controller 201 coupled to the information source/sink 101, the modulator/demodulator 103 and the amplifier 107.

The controller 201 can in these embodiments be configured to control the information source/sink 101, modulator/demodulator 103, and amplifier 107 in such a manner that enables the transducer speaker to be used for both communication (and in particular near field communication applications) by generating a magnetic or electrical field which is modulated with the relevant transmission data signal and receiving a magnetic or electrical field modulated with relevant reception data signal, and audio or acoustic wave generation or reception.

The controller 201 in some embodiments comprises a receiver/transmitter (Rx/Tx) mode controller 251. The receiver/transmitter mode controller 251 can in some embodiments be configured to control the data flow through the apparatus. For example as shown in FIGS. 3 to 5 the Rx/Tx mode controller can be configured to control the switch/modulators to control the flow of data through the information source/sink 101, modulator/demodulator 103 and the amplifier 107 dependent on whether or not the communication apparatus is to be used as a transmitter or receiver.

In some embodiments the controller 201 and the receiver/transmitter mode controller 251 can control whether communication between apparatus operates in simplex mode communication (in other words either being used only to transmit or receive) or half duplex mode communication (in other words time division multiplexing the transmission or reception but not transmitting and receiving at the same time). In some embodiments full duplex data communication can be achieved by frequency domain multiplexing. In such embodiments the Rx/Tx mode controller 251 can be configured to configure the amplifier 107, modulator/demodulator 103 and information source/sink 101 data flow so to allow two directional data flow with data flow in a first direction being modulated at a first frequency band and data flow in the other direction modulated at a second different frequency band. In such embodiments data flow control can be achieved by the amplifier and/or transducer coil comprising a filter configured to separate out the data signals.

In some embodiments the controller 201 can comprise a modulation mode detector/controller 253. The modulation mode detector/controller 253 can be configured to determine or detect the modulation to be applied to the transmission data and/or the modulation having been applied to the received data to enable the demodulator to demodulate the received data. In some embodiments the modulation mode detector/controller 253 can be configured to determine the modulation scheme applied to the received data based on the received signal, an indicator or signal received prior to the data such as in a hand shaking or preamble, or a determined or predetermined standard modulation scheme.

In some embodiments the controller 201 can further comprise a hand shaking/signal flow controller 255. The hand shaking/signal flow controller 255 can be configured to receive hand shaking or signal flow data, for example received data in an initial preamble which determines the hand shaking and signal flow control mechanism to be used on receiving data. Furthermore in some embodiments the hand shaking/signal flow controller 255 can be configured to control the modulator/demodulator and amplifier in such a way that when the near field communication system is being used in a transmit mode the near field communication system operates with the suitable or appropriate hand shaking or signal flow control mechanism.

Figure 12A:
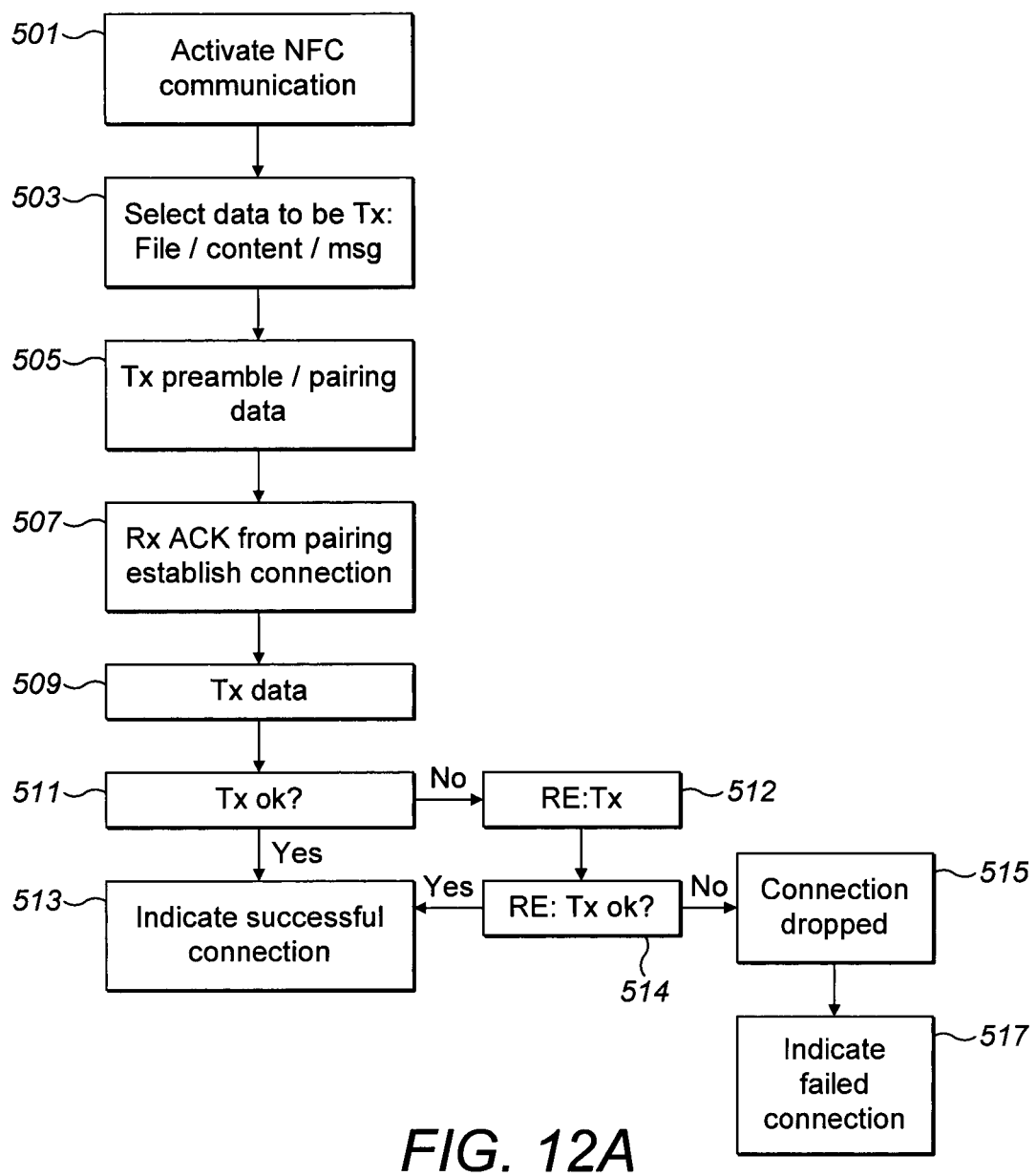
FIG. 12a illustrates a flow diagram showing the operation of a transmitter data flow according to some embodiments.

With respect to FIG. 12a the operation of apparatus according to some further embodiments with respect to transmitting data is shown by a flow diagram.

The transmitter apparatus can, for example, activate the near field communication system. The activation can in some embodiments be activated manually by a user interface input from the user. Furthermore in some embodiment the system can be activated automatically or semi-automatically on detection of a suitable receiver apparatus. For example in some embodiments the apparatus controller 201 can be configured to control the information source to generate polling messages which are transmitted, when received by a neighbouring apparatus the polling message can be replied to which when received by the original transmitter indicates a suitable receiver is available and activates the communication system components. In some embodiments the activation of the near field communications system can be indicated to the user by an audible signal using the same transducer to be used for data transmission.

The activation of the near field communication system is shown in FIG. 12a by step 501.

The controller 201 can further be configured to select the data or information source data content to be transmitted. The data can, for example, be a file, other media content data such as a www link or contact data, or some type of message such as, for example, a text or multimedia message. In some embodiments the data selected can be user selected, for example when one apparatus is attempting to transfer an electronic contact file to a further apparatus the user of the apparatus can be configured to via the user interface select the contact details to be transferred. In some embodiments the data selected can be in response to a request message or signal from the other apparatus, for example a request for a specified electronic contact file.

The selection of the data to be transmitted is shown in FIG. 12a by step 503.

The controller 201 (and handshaking/signal flow controller 255) can in some embodiments be configured to generate and transmit a preamble (or pairing message) or signal. The preamble (or pairing) data can, for example, be configured to pass to the receiver suitable information enabling the receiver to apply the correct demodulation and/or decoding for the following message or data being transmitted. Furthermore in some embodiments the preamble/pairing data can be configured to indicate to the receiver the transmitter identity, and furthermore be configured to pass in some embodiments control flow data enabling the receiver to be configured to apply appropriate error detection/error correction processes.

The transmission of the preamble of pairing data is shown in FIG. 12a by step 505.

In some embodiments the transmitter requires an acknowledgment from the receiver to establish the connection. For example in some embodiments, in response to the transmitted preamble/pairing data, the apparatus can switch to a receiving mode to detect an acknowledgment from a receiver of the original preamble/pairing data to determine that the other apparatus is suitably configured to receive the data.

The operation of receiving the acknowledgment from the pairing establishing the connection is shown in FIG. 12a by step 507.

In some embodiments the apparatus can then be configured to indicate to the operator of the apparatus that a pairing has been completed and that data is about to be transferred. For example in some embodiments the apparatus can be configured to indicate an audible signal via the speaker that the pairing connection has been established. In some embodiments the connection establishment audible signal can differ from the available connection or coupling audible signal output when the transmitter is activated.

Furthermore in some embodiments controller can then be configured to control the flow of data transmitted.

The transmission of data is shown in FIG. 12a by step 509.

In some embodiments the controller 201 can be configured to perform data flow checking. The data flow check can in some embodiments be a continuous data flow check, for example monitoring acknowledgements from the receiver or monitoring negative acknowledgements where the receiver detects an error in the data received. In some embodiments the data flow check can be discrete file or coupling checks, such as receiving acknowledgments following the completion of the data transmission. In the following example the controller is configured to receive an acknowledgement after the file/content has been transmitted.

The transmission check is shown in FIG. 12a by step 511.

Where the transmission check fails (the file/content was not delivered without errors or without errors which could be corrected) then the transmitter can be configured to retransmit the data.

The operation of retransmitting the data is shown in FIG. 12a by step 512.

In some embodiments the retransmission is followed by a further check whether or not the transmission is okay.

Where the retransmission fails the apparatus can further retransmit (either for a defined number of times or for a period of time) until the retransmission check step shown in FIG. 12 by step 514 fails and the apparatus drops the connection or the retransmission was successful.

The dropping of the connection is shown in FIG. 12a by step 515.

Furthermore the controller 201 can be configured to indicate that a failed transmission/retransmission, for example by an audible signal. In some embodiments the failed transmission audible signal is different from the detection or the initial connection audible signals.

The indication of the failed connection is shown in FIG. 12a by step 517.

Where a successful connection is made by either the initial transmission or a retransmission the apparatus can further be configured to indicate that a successful connection has been performed by providing a further audible connection sound. The success audible signal can in some embodiments further differ from the other audible signals.

The operation of indicating a successful connection is shown in FIG. 12a by step 513.

Figure 12B:
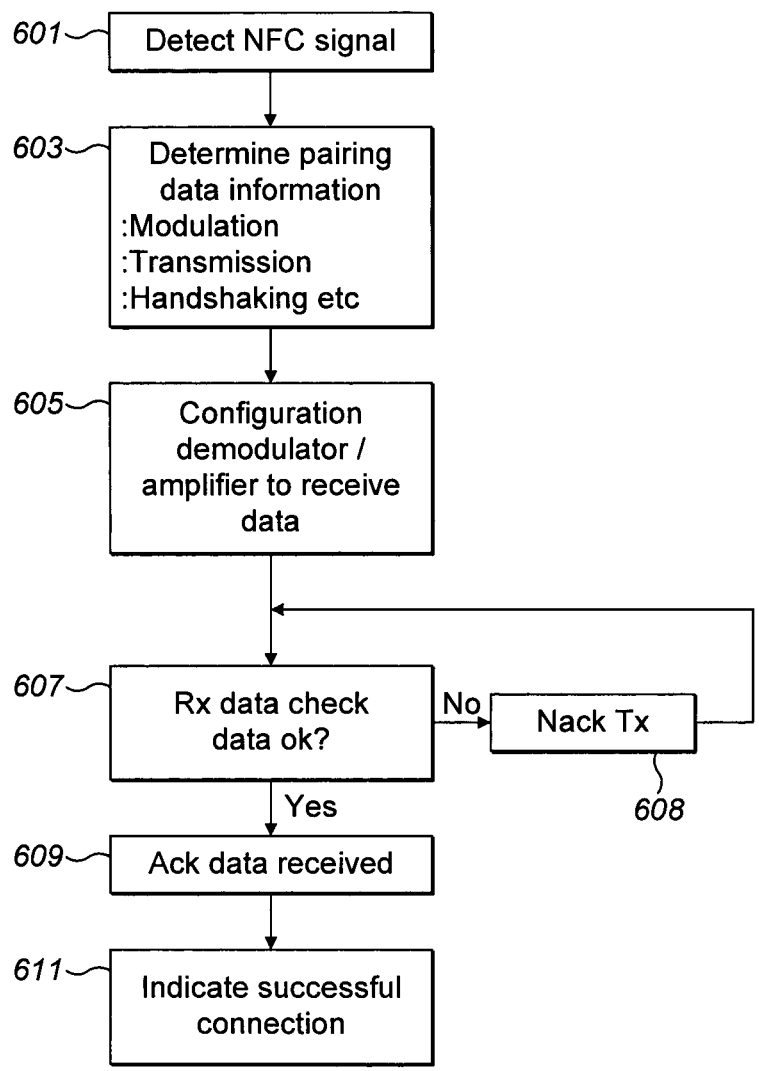
FIG. 12b illustrates a flow diagram showing the operation of a receiver data flow according to some embodiments.

With respect to FIG. 12b the operation of the apparatus according to some further apparatus as a receiver is shown in further detail.

The controller 201 can for example in some embodiments detect the near field communication initiation signal, such as for example in some embodiments a preamble or pairing request signal, or a detection or polling request signal.

The detection of the near field communication initiation signal is shown in FIG. 12b by step 601.

In some embodiments the controller 201 can be configured to determine pairing or coupling data information from the near field communication initiation signal. The pairing data information can, for example, provide the receiver with information regarding the modulation method of the transmitted data to be received, the type of transmission, the identity of the transmitter, and signal control flow information such as configuring hand shaking control.

The determination of the pairing data information is shown in FIG. 12b by step 603.

In some embodiments the controller can be configured on determining pairing or coupling data control the apparatus to transmit an acknowledgement back to the transmitter apparatus confirming the receipt of the message and indicating that the receiver is ready to receive the transmission data. In some embodiments the establishment of the coupling between the transmitter and the receiver can cause the controller to be configured to control the receiver to indicate, for example by way of an audible signal that coupling has been established.

In some embodiments the receiver apparatus on receipt of the coupling data requires an input via the user interface to confirm that the coupling is to be allowed. In such embodiments the refusal of a coupling or connection can be indicated by an audible signal, which may be different from the coupling established audible signal.

In some embodiments the controller 201 can be configured to control or configure the demodulator/amplifier such to receive the data using the pairing data information.

The operation of configuring the demodulator/amplifier to receive the data is shown in FIG. 12b by step 605.

The controller can then be further configured in some embodiments to perform a received data check. In some embodiments the controller can be configured to determine whether the received signal contains errors or contains errors which cannot be corrected. In some embodiments the data check can be performed at the end of each message, or during the data flow.

The operation of performing the received data check is shown in FIG. 12b by step 607.

Where the data check is failed then in some embodiments the receiver apparatus can be configured to transmit back to the transmitting apparatus a transmission failure message. In some embodiments a transmission failure message can be a negative acknowledge (NACK) message. In some embodiments the NACK message can trigger the resending or repeating of the original message. In some embodiments the transmission failure is indicated to the transmitter apparatus by the absence of a positive acknowledgement message being sent to the transmitter.

The operation of negative acknowledging the transmission is shown in FIG. 12b by step 608.

Where the controller determines that the data has been correctly received the receiver controller can in some embodiments be configured to generate an acknowledgment that the data has been received and passes to the data transmitter.

The operation of determining the acknowledgment of the data received is shown in FIG. 12b by step 609.

The receiver controller furthermore can be configured to generate a successful connection indication, for example by generating an audible signal. The success audible signal in some embodiments may differ from the other audible signals.

The operation of indicating a successful connection is shown in FIG. 12b by step 611.

Figure 11:
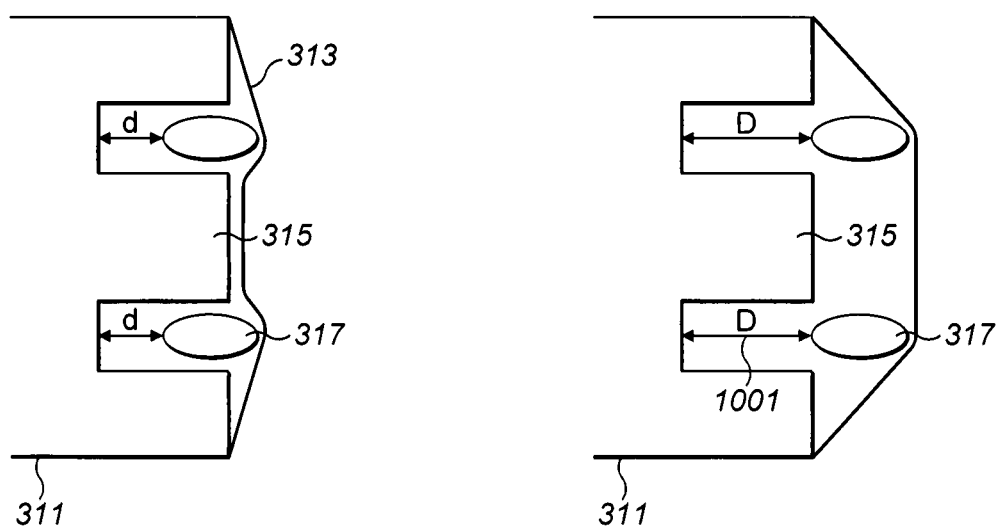
FIG. 11 illustrates a schematic diagram showing an enhanced inductive coupling configuration of the apparatus according to some embodiments.

With respect to FIG. 11 an example of coil location enhancement according to some embodiments of the application is shown. The transducer is shown in FIG. 11 as a speaker using references as shown in FIG. 7. The left-hand figure shows that the coil 317 has a natural bias location from the speaker body 311 of dimension d. In such circumstances the speaker foil 313 is able to move both towards and away from the speaker body in order to generate suitable acoustic waves. However it will be appreciated that the static or low frequency magnetic field of the speaker generated by the speaker magnet 315 can have components which interfere with the data electrical or magnetic fields generated by the speaker coil 317.

It would be appreciated that in some embodiments the apparatus can by applying a bias current of a suitable value, such as a DC bias current, enable the speaker coil to generate a sufficient electrical or magnetic field interfering with the speaker magnet 315 and forcing the speaker coil away from the magnet such that in the coil is located at dimension D from the magnet. The distance D, being greater than d, has the advantage that alternating electrical fields or magnetic fields generated using the data magnetic induction communication frequencies experience lower noise or interference values from the speaker magnet 315. Furthermore the moving of the coils away from the magnet can permit closer placement of associated receiver speaker or transducer coils. In other words by moving the speaker coil away from the magnet it is possible to locate the speaker coils for magnetic induction coupling closer to each other thus decreasing the induction distance and therefore increasing the possible signal to noise ratio of the magnetic coupling.

It shall be appreciated that the term portable apparatus is user equipment. The user equipment is intended to cover any suitable type of wireless user equipment, such as mobile telephones, portable data processing apparatus or portable web browsers. Furthermore, it will be understood that the term acoustic sound channels is intended to cover sound outlets, channels and cavities, and that such sound channels may be formed integrally with the transducer, or as part of the mechanical integration of the transducer with the apparatus.

In general, the various embodiments may be implemented in hardware or special purpose circuits, software, logic or any combination thereof. Some aspects of the application may be implemented in hardware, while other aspects may be implemented in firmware or software which may be executed by a controller, microprocessor or other computing apparatus, although the application is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing apparatus, or some combination thereof.

The embodiments of this application may be implemented by computer software executable by a data processor of the mobile apparatus, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the applications may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this application. However, various modifications and adaptations may become apparent to those skilled in the relevant arts in view of the foregoing description, when read in conjunction with the accompanying drawings and the appended claims. However, all such and similar modifications of the teachings of this application will still fall within the scope of this application as defined in the appended claims. Indeed there is a further embodiment comprising a combination of one or more of any of the other embodiments previously discussed.

The invention claimed is:

1. An apparatus comprising: a transducer comprising a first voice coil configured to generate an acoustic sound wave at least utilizing the first voice coil for generating acoustic sound information via the acoustic sound wave, the transducer further configured to generate and detect a non-acoustic data transmitting magnetic field at least based on utilizing the first voice coil, the non-acoustic data transmitting magnetic field representing non-acoustic information capable of magnetically coupling the apparatus to a further apparatus comprising a further apparatus transducer, wherein the further apparatus transducer comprises a second coil configured to generate acoustic sound information at least utilizing the second coil and to detect at least based on utilizing the second coil the non-acoustic information, wherein the apparatus is magnetically coupled to the further apparatus to transfer data via the non-acoustic information, wherein the acoustic sound information and the non-acoustic information are different.

2. The apparatus as claimed in claim 1, wherein the transducer comprises:
a speaker diaphragm coupled to the first voice coil suitable for generating the acoustic sound wave.

3. The apparatus as claimed in claim 1, further comprising a comparator configured to detect data within the magnetic field.

4. The apparatus as claimed in claim 3, wherein the magnetic field data detector comprises at least one of:
an amplifier coupled to first voice coil and configured to amplify the first voice coil output; and
a demodulator coupled to the amplifier and configured to output the data from the first voice coil output.

5. The apparatus as claimed in claim 1, further comprising an amplifier configured to be selectively coupled to the transducer.

6. The apparatus as claimed in claim 5, wherein the amplifier is configured to drive the transducer coil to magnetically couple the apparatus to a further apparatus transducer for transferring data.

7. The apparatus as claimed in claim 5, wherein the amplifier is configured to drive the transducer coil to generate the acoustic sound wave.

8. The apparatus as claimed in claim 5, wherein the amplifier is configured with a bandwidth from 20 Hz to 10 MHz.

9. The apparatus as claimed in claim 5, wherein the amplifier comprises a first amplifier configured to drive the transducer coil to magnetically couple the apparatus to the further apparatus transducer to transfer data; and a second amplifier configured to drive the transducer coil to generate the acoustic sound wave.

10. The apparatus as claimed in claim 9, wherein the first amplifier is configured with a bandwidth from 20 kHz to 10 MHz, and the second amplifier is configured with a bandwidth from 20 Hz to 20 kHz.

11. The apparatus as claimed in claim 5, further comprising a modulator coupled to the amplifier, the modulator configured to transfer data.

12. The apparatus as claimed in claim 11, wherein the modulator comprises at least one of:
a direct coding modulator;
a frequency modulator;
a time-division modulator;
a phase modulator;
an error detection modulator; and
an error correction modulator.

13. The apparatus as claimed in claim 1, wherein the transducer comprises at least one of:
an earpiece transducer;
an integrated hands free transducer;
a headset transducer; and
an hearing aid transducer.

14. The apparatus as claimed in claim 1, wherein the transducer is configured to adaptively couple the apparatus to the further apparatus transducer when the magnetic field is detected.

15. The apparatus as claimed in claim 14, wherein the adaptive coupling comprises at least one of:
adaptive data rate coupling;
adaptive modulation coupling; and
adaptive frequency coupling.

16. The apparatus as claimed in claim 1, wherein the transducer comprises: a static magnet; and wherein the first voice coil is biased at a first distance from the static magnet when the transducer is suitable for generating the acoustic sound wave, and biased at a second distance greater than the first distance from the static magnet when configured to magnetically couple the apparatus to the further apparatus transducer.

17. The apparatus as claimed in claim 16, further comprising a biasing amplifier coupled to the transducer, wherein the biasing amplifier is configured to provide a first current to bias the first voice coil at the first distance from the static magnet, and a second current to bias the first voice coil at the second distance.

18. A method comprising providing a transducer comprising a first voice coil configured to generate an acoustic sound wave at least utilizing the first voice coil for generating acoustic sound information via the acoustic sound wave, the transducer further configured to generate and detect a non-acoustic data transmitting magnetic field at least based on utilizing the first voice coil, the non-acoustic data transmitting magnetic field representing non-acoustic information capable of magnetically coupling the apparatus to a further apparatus comprising a further apparatus transducer wherein the further apparatus transducer comprises a second coil configured to generate acoustic sound information at least utilizing the second coil and to detect at least based on utilizing the second coil the non-acoustic information, wherein the apparatus is magnetically coupled to the further apparatus to transfer data via the non-acoustic information, wherein the acoustic sound information and the non-acoustic information are different.

\* \* \* \* \*